US007847865B2

(12) United States Patent
Hasegawa

(10) Patent No.: US 7,847,865 B2
(45) Date of Patent: Dec. 7, 2010

(54) DIGITAL TELEVISION BROADCASTING RECEIVING APPARATUS, CONTROL METHOD FOR DIGITAL TELEVISION BROADCASTING RECEIVING APPARATUS, AND CONTROL PROGRAM FOR THE SAME

(75) Inventor: Taketo Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1234 days.

(21) Appl. No.: 11/419,577

(22) Filed: May 22, 2006

(65) Prior Publication Data

US 2006/0268163 A1 Nov. 30, 2006

(30) Foreign Application Priority Data

May 27, 2005 (JP) .............................. 2005-155623

(51) Int. Cl.
*H04N 5/50* (2006.01)
*H04N 5/268* (2006.01)
*H04N 7/173* (2006.01)

(52) U.S. Cl. ...................... 348/725; 348/706; 348/731; 348/569; 725/94

(58) Field of Classification Search ................. 348/705, 348/706, 725, 731; 725/94
See application file for complete search history.

(56) References Cited

U.S. PATENT DOCUMENTS

| 5,933,192 | A | * | 8/1999 | Crosby et al. | ........... | 375/240.25 |
| 5,978,855 | A | * | 11/1999 | Metz et al. | ................... | 709/249 |
| 5,999,192 | A | * | 12/1999 | Selfridge et al. | ............ | 345/440 |
| 6,091,456 | A | * | 7/2000 | Schaas | ........................ | 348/460 |
| 6,115,080 | A | * | 9/2000 | Reitmeier | ................... | 348/731 |
| 6,209,127 | B1 | * | 3/2001 | Mori et al. | .................. | 717/162 |
| 6,337,719 | B1 | * | 1/2002 | Cuccia | ....................... | 348/731 |
| 6,519,011 | B1 | * | 2/2003 | Shendar | ...................... | 348/731 |
| 6,598,223 | B1 | * | 7/2003 | Vrhel et al. | ................. | 717/174 |
| 6,804,824 | B1 | * | 10/2004 | Potrebic et al. | ............... | 725/38 |
| 6,950,151 | B1 | * | 9/2005 | Wrife | ......................... | 348/731 |
| 6,985,188 | B1 | * | 1/2006 | Hurst, Jr. | .................... | 348/553 |
| 7,071,999 | B2 | * | 7/2006 | Lee | ............................. | 348/714 |
| 7,084,930 | B2 | * | 8/2006 | Okabe | ........................ | 348/731 |
| 7,142,255 | B2 | * | 11/2006 | Nohrden | ..................... | 348/725 |
| 7,239,359 | B2 | * | 7/2007 | Matsuyama et al. | ......... | 348/732 |
| 7,327,790 | B1 | * | 2/2008 | Bretl et al. | ............ | 375/240.26 |
| 7,412,150 | B2 | * | 8/2008 | Nishikawa et al. | ............ | 386/83 |
| 7,523,482 | B2 | * | 4/2009 | Barrett et al. | ............... | 725/120 |
| 7,562,375 | B2 | * | 7/2009 | Barrett et al. | ................. | 725/38 |
| 7,589,789 | B2 | * | 9/2009 | Choi | .......................... | 348/441 |

(Continued)

FOREIGN PATENT DOCUMENTS

JP 9-298752 11/1997

*Primary Examiner*—Brian Yenke
(74) *Attorney, Agent, or Firm*—Fitzpatrick, Cella, Harper & Scinto

(57) ABSTRACT

A digital television broadcasting receiving apparatus is arranged so as to execute a process requiring to stop an image display at the time of channel change-over, without giving a user a sense of incompatibility and forcing the user to perform unnecessary operations. The digital television broadcasting receiving apparatus can receive a digital television broadcasting signal and operates in accordance with an operation program stored in a memory. A system controller executes a data write process, such as an operation program update process and a memory storage area relocation process, of writing data in the memory if a channel change-over decision unit judges a channel change-over, for example, before a video decoder starts a decoding process for a channel data signal newly selected.

9 Claims, 14 Drawing Sheets

U.S. PATENT DOCUMENTS

| | | | |
|---|---|---|---|
| 2002/0087973 A1* | 7/2002 | Hamilton et al. | 725/32 |
| 2003/0016944 A1* | 1/2003 | Kato | 386/46 |
| 2004/0003399 A1* | 1/2004 | Cooper | 725/38 |
| 2004/0139480 A1* | 7/2004 | Delpuch et al. | 725/135 |
| 2004/0146280 A1 | 7/2004 | Hasegawa et al. | 386/83 |
| 2004/0160974 A1* | 8/2004 | Read et al. | 370/431 |
| 2004/0181813 A1* | 9/2004 | Ota et al. | 725/131 |
| 2004/0189879 A1* | 9/2004 | Read | 348/731 |
| 2004/0194134 A1* | 9/2004 | Gunatilake et al. | 725/38 |
| 2005/0160453 A1* | 7/2005 | Kim | 725/39 |
| 2005/0207449 A1* | 9/2005 | Zhang et al. | 370/486 |
| 2006/0075428 A1* | 4/2006 | Farmer et al. | 725/38 |
| 2006/0085828 A1* | 4/2006 | Dureau et al. | 725/100 |
| 2006/0123443 A1* | 6/2006 | Hamilton et al. | 725/32 |
| 2006/0245446 A1* | 11/2006 | Agusa et al. | 370/432 |
| 2006/0271971 A1* | 11/2006 | Drazin | 725/86 |
| 2007/0171306 A1* | 7/2007 | Lowet et al. | 348/565 |
| 2007/0234395 A1* | 10/2007 | Dureau et al. | 725/135 |
| 2009/0066852 A1* | 3/2009 | Dai et al. | 348/731 |
| 2009/0161769 A1* | 6/2009 | Barrett et al. | 375/240.25 |

\* cited by examiner

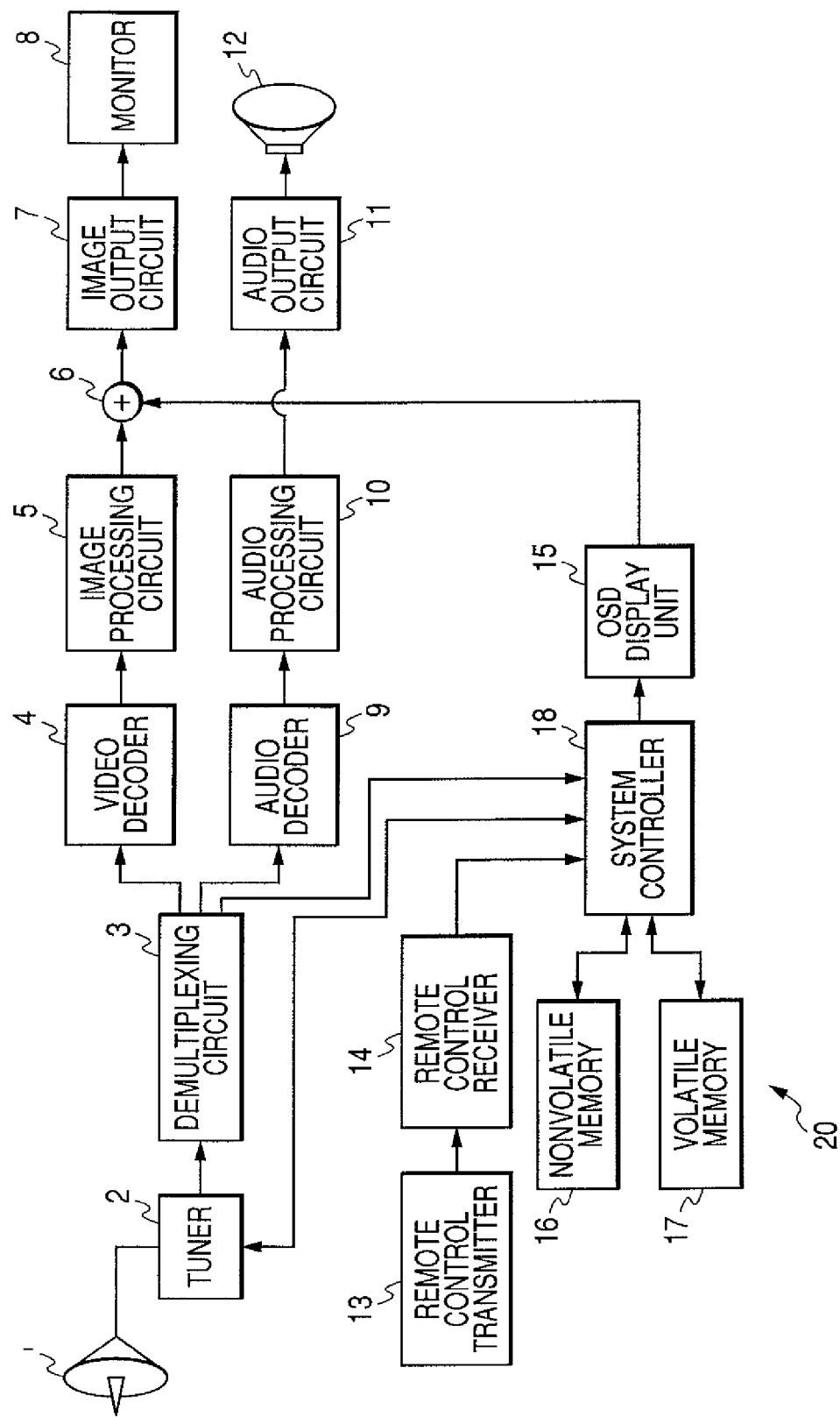

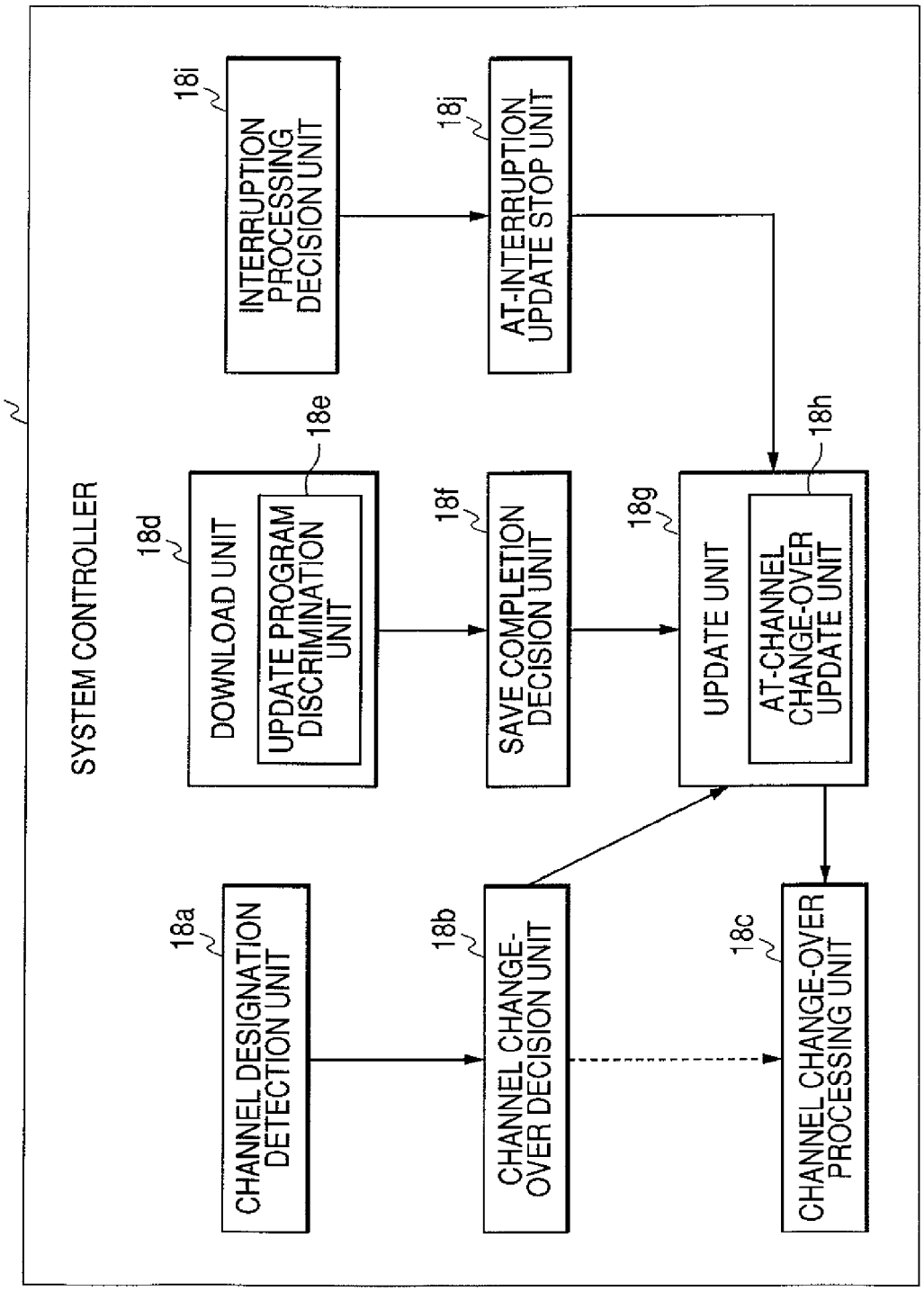

FIG. 3

VIDEO SEQUENCE

| video_sequence0 { | NO. OF BITS | MNEMONIC |
|---|---|---|
| next_start_code0 | | |
| sequence_header0 | | |
| if (nextbits == extension_start_code) { | | |
| sequence_extension0 | | |
| do { | | |
| extension_and_user_data (0) | | |
| do { | | |
| if (nextbits0 == group_start_code) { | | |
| group_of_pictures_header0 | | |
| extension_and_user_data (1) | | |
| } | | |
| picture_header0 | | |
| picture_coding_extension0 | | |
| extensions_and_user_data (2) | | |
| picture_data0 | | |
| } while ((nextbits0 == picture_start_code) \|\| | | |
| (nextbits0 == group_start_code)) | | |
| if (nextbits0 != sequence_end_code) { | | |
| sequence_header0 | | |
| sequence_extension0 | | |
| } | | |
| } while (nextbits0 != sequence_end_code) { | | |
| } else { | | |
| /* ISO/IEC 11172-2 */ | | |
| } | | |
| sequence_end_code | 32 | bslbf |
| } | | |

FIG. 4

PICTURE HEADER

| picture_header0 { | NO. OF BITS | MNEMONIC |
|---|---|---|
| picture_start_code | 32 | bslbf |
| temporal_reference | 10 | uimsbf |
| picture_coding_type | 3 | uimsbf |
| vbv_delay | 16 | uimsbf |
| if (picture_coding_type == 2 \| \| picture_coding_type == 3) { | | |
| full_pel_forward_vector | 1 | bslbf |
| forward_f_code | 3 | bslbf |
| } | | |
| if (picture_coding_type == 3) { | | |
| full_pel_backward_vector | 1 | bslbf |
| backward_f_code | 3 | bslbf |
| } | | |
| whilw (nextbits0 == '1') { | | |
| extra_bit_picture /* with the value '1' */ | 1 | uimsbf |
| extra_information_picture | 8 | uimsbf |
| } | | |
| extra_bit_picture /* with the value '0' */ | 1 | uimsbf |
| next_start_code0 | | |
| } | | |

FIG. 5

| PICTURE_CODING_TYPE | CODING METHOD |
|---|---|
| 000 | FORBIDDEN |
| 001 | INTRA-CODED (I) |
| 010 | PREDICTIVE-CODED (P) |
| 011 | BIDIRECTIONALLY-PREDICTIVE-CODED (B) |
| 100 | STALL NOT BE USED (dc intra-coded (D) in ISO/IEC11172-2) |
| 101 | RESERVED |
| 110 | RESERVED |
| 111 | RESERVED |

DIGITAL TELEVISION BROADCASTING RECEIVING APPARATUS, CONTROL METHOD FOR DIGITAL TELEVISION BROADCASTING RECEIVING APPARATUS, AND CONTROL PROGRAM FOR THE SAME

BACKGROUND OF THE INVENTION

1. Field of the Invention

The present invention relates to a digital television broadcasting receiving apparatus capable of receiving a digital television broadcasting signal, a control method for the digital television receiving apparatus, and a control program for the digital television receiving apparatus.

2. Related Background Art

Generally, in digital television broadcasting, video and audio data signals (MPEG signals) of a plurality of channels, compressed by the Moving Picture Experts Group (MPEG) standards, and digital data are multiplexed to broadcast multiplexed digital television signals. A digital television broadcasting receiving apparatus receives multiplexed digital television broadcasting signals with an antenna or the like, demodulates the signals by a predetermined modulation method such as Quadrature Phase Shift Keying (QPSK) and Quadrature Amplitude Modulation (16QAM), separates the multiplexed Signals into video and audio data and digital data of a desired program, performs a decoding process (decodes) the video and audio data compressed by the MPEG standards, and outputs the decoded signals via a video output circuit and an audio output circuit to a monitor and a speaker (refer to Japanese Patent Application No. H09-298752).

Video data compressed by the MPEG standards is constituted of three types of compressed frames: an I picture, a P picture and a B picture (refer to FIG. 2). The I picture is data capable of being decoded by itself, whereas the P and B pictures are difference data requiring reference frames. Namely, the P and B pictures can be decoded into video data, by using the P and B pictures on the basis of the I picture. However, since decoding starts from the I picture, if a channel is to be changed over between the program being viewed and another program, decoding the video data of the changed program starts after the I picture appears. Namely, an image to be displayed cannot be generated until the I picture appears, so that a monitor of the digital television broadcasting receiving apparatus for displaying an image displays no image.

The digital television broadcasting receiving apparatus of the type described above is structured to effect signal processing and operation processing in accordance with an operation program stored in a memory (if the receiver has a hardware circuit for effecting signal processing and operation processing, this circuit effects signal processing and operation processing). The BS digital broadcasting operation rules defined by the corporation, Association of Radio Industries and Businesses (alias: ARIB) describe that in BS digital broadcasting "Software of a receiver is corrected. Bug fixing, correction of defects caused by a difference of operation interpretations between a transmitter and a receiver, improvements on display, improvements on response speed, usage operation, and etc are performed." In order to satisfy the rules, update program data is sent being contained in digital television broadcasting signals, the update program data solving defects of, and improving the function of, an operation program of a digital television broadcasting receiving apparatus. Transmission of the update program data is not limited to a BS digital broadcasting.

Namely, the above-described digital data contains not only contents data and the like to be used by digital television broadcasting but also program data (so-called update program data) for a digital television broadcasting receiving apparatus in operation. When a broadcasting station transmits the digital broadcasting signals containing update program data for a digital television broadcasting receiving apparatus to the digital television broadcasting receiving apparatus, the broadcasting station transmits the update program data by utilizing an idle time between transmission of the video and audio data. A digital television broadcasting receiving apparatus is structured in the following manner. If the update program data is contained in the digital television broadcasting signals, the digital television broadcasting receiving apparatus checks whether a vendor name (maker name) and a receiver model are compatible with those of the digital television broadcasting receiving apparatus. If this check indicates that the vendor name and receiver model are compatible, the digital television broadcasting receiving apparatus stores (downloads) the update program data in a predetermined program data storage area of, e.g., a non-volatile memory.

If the update program is stored, an update process is performed to update the program stored previously to the newly stored update program. However, for this update process, the operation program used previously is required to be stopped (namely, decoding is required to be stopped). Since images to be displayed cannot be generated during this period, the update process for the program is generally performed when a restart is performed (when a power is turned on next). Therefore, particularly in the case in which a power of a digital television broadcasting receiving apparatus is not turned off for a long period, the operation program is not updated immediately, even if the new update program for eliminating defects and improving the function has already been acquired. There arises therefore a problem that it is not possible to eliminate defects and improve the function, until a restart is performed (until a power is turned on next).

Generally, the digital television broadcasting receiving apparatus of the type described above has a memory for storing the operation program and various data. In order to effectively use the memory capacity, a process is executed to retain memory blocks having a necessary capacity only when necessary, and to release the memory blocks when unnecessary. However, if memory blocks are repetitively retained and released, memory blocks still not used are finely divided and become fragmentary. If the memory continues to be used in this state, the operation program and various data are dispersed in the memory. There is a fear that an access speed lowers and the function of the digital television broadcasting receiving apparatus is degraded. It is therefore necessary to relocate memory blocks not in use and memory blocks in use, and to collect memory blocks in use so as not to disperse the operation program and various data to be stored next. However, the digital television broadcasting receiving apparatus of this type requires a large amount of calculation processing ability (so-called CPU power) of decoding MPEG signals and the like. Therefore, if the calculation processing ability (CPU power) is assigned to memory relocation, then there arises a fear that images to be displayed cannot be generated because MPEG signals cannot be decoded (i.e., because there is a necessity of stopping decoding). In order to suppress generation of such defects, memory relocation has been performed when a restart is performed (when the power is turned on next).

SUMMARY OF THE INVENTION

It is an aspect of the invention to provide a digital television broadcasting receiving apparatus, a control method for the digital television broadcasting receiving apparatus, and its control program, capable of solving the above-described problems.

Namely, in order to achieve the above-described object, a digital television broadcasting receiving apparatus of the present invention being capable of receiving a digital television broadcasting signal containing a channel data signal corresponding to each channel and having a memory unit for storing an operation program, comprises: a decoding unit for executing a process of decoding the channel data signal into video and audio signals; a decision unit for judging whether a channel change-over process occurs or not; and a processing unit for executing a data write process of writing data into the memory unit if the decision unit judges that the channel change-over process occurred, during a period from a time when the channel change-over process occurred to a time when the decoding unit starts a decoding process for the channel data signal newly selected by the channel change-over process.

Other features and advantages of the present invention will become apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, server to explain the principles of the invention.

FIG. 1A is a diagram showing the structure of a digital television broadcasting receiving apparatus.

FIG. 1B is a block diagram illustrating a control concept of a system controller according to a first embodiment.

FIG. 3 is a diagram showing a transmission format of data of MPEG2.

FIG. 4 is a diagram showing the format of a picture header.

FIG. 5 is a diagram showing a picture code type.

DETAILED DESCRIPTION OF THE PREFERRED EMBODIMENTS

Exemplary embodiments of the present invention will now be described in detail in accordance with the accompanying drawings.

First Embodiment

Figure 2:
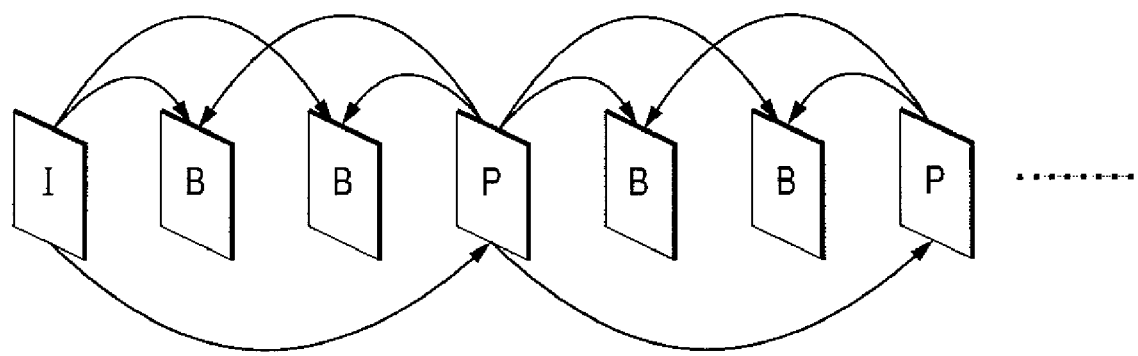
FIG. 2 is an illustrative diagram showing the structure of digital video data of MPEG2.
Figure 6:
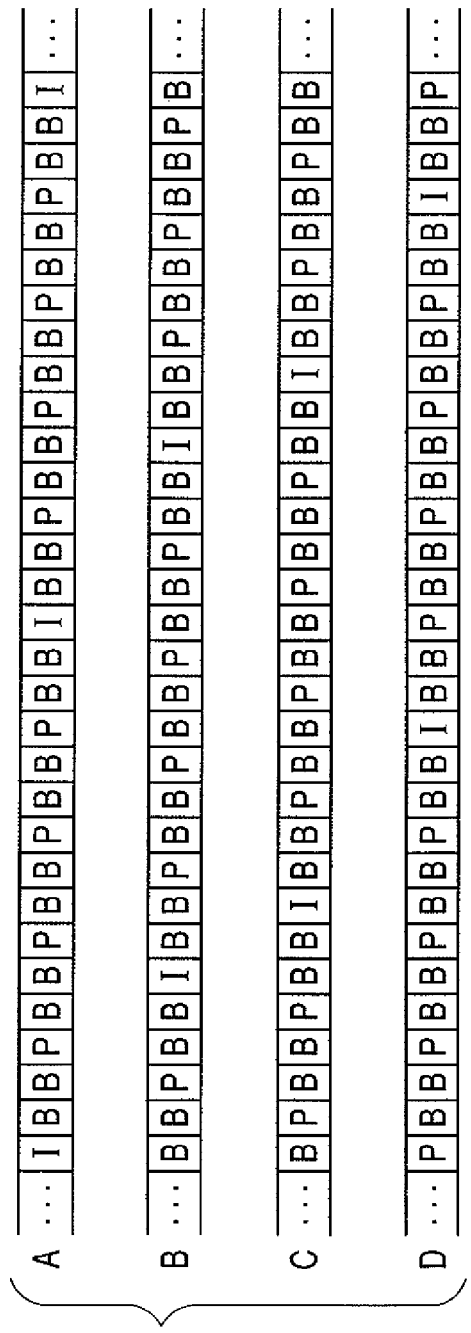
FIG. 6 is a diagram showing a layout of four digital video data.
Figure 7:
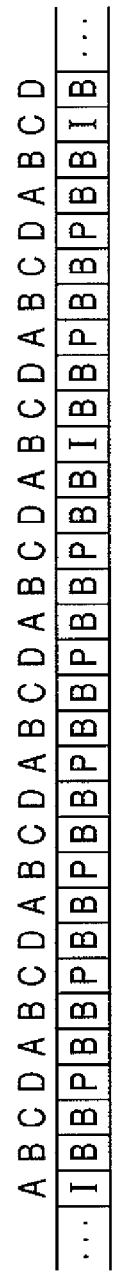
FIG. 7 is a diagram showing a layout of multiplexed four digital video data.
Figure 8:
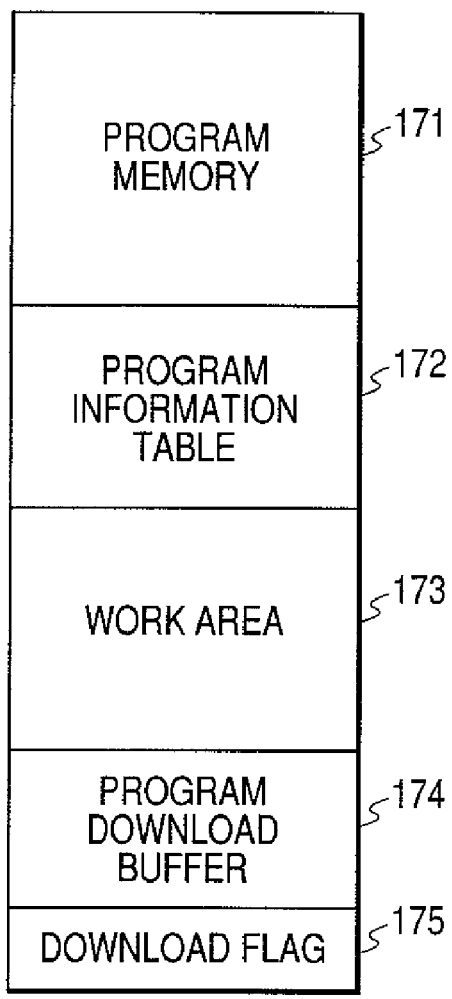
FIG. 8 is a diagram showing the internal structure of a volatile memory.
Figure 9:
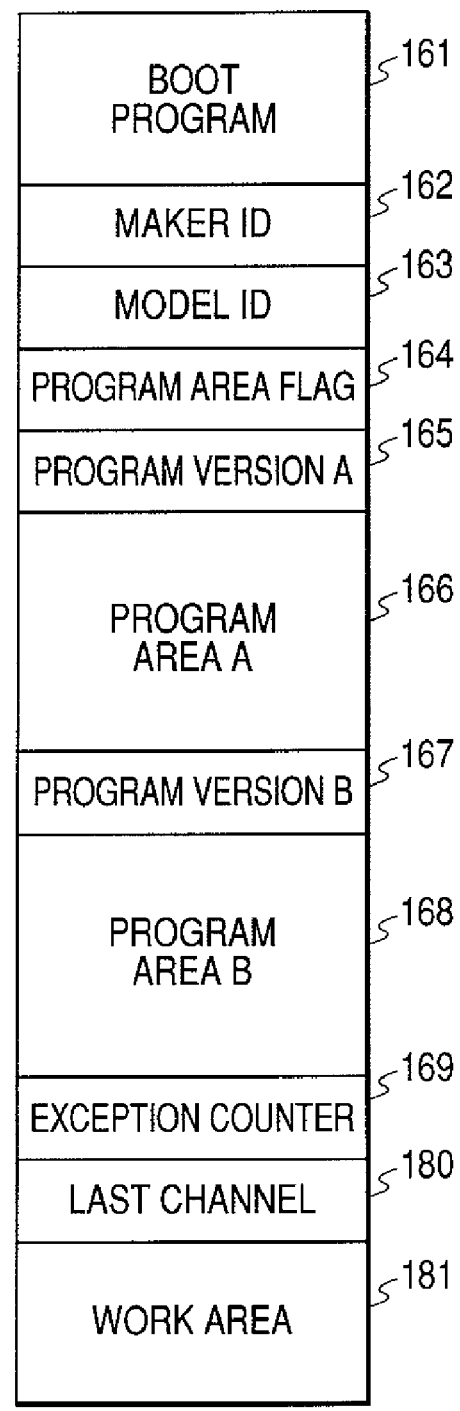
FIG. 9 is a diagram showing the internal structure of a non-volatile memory.
Figure 10:
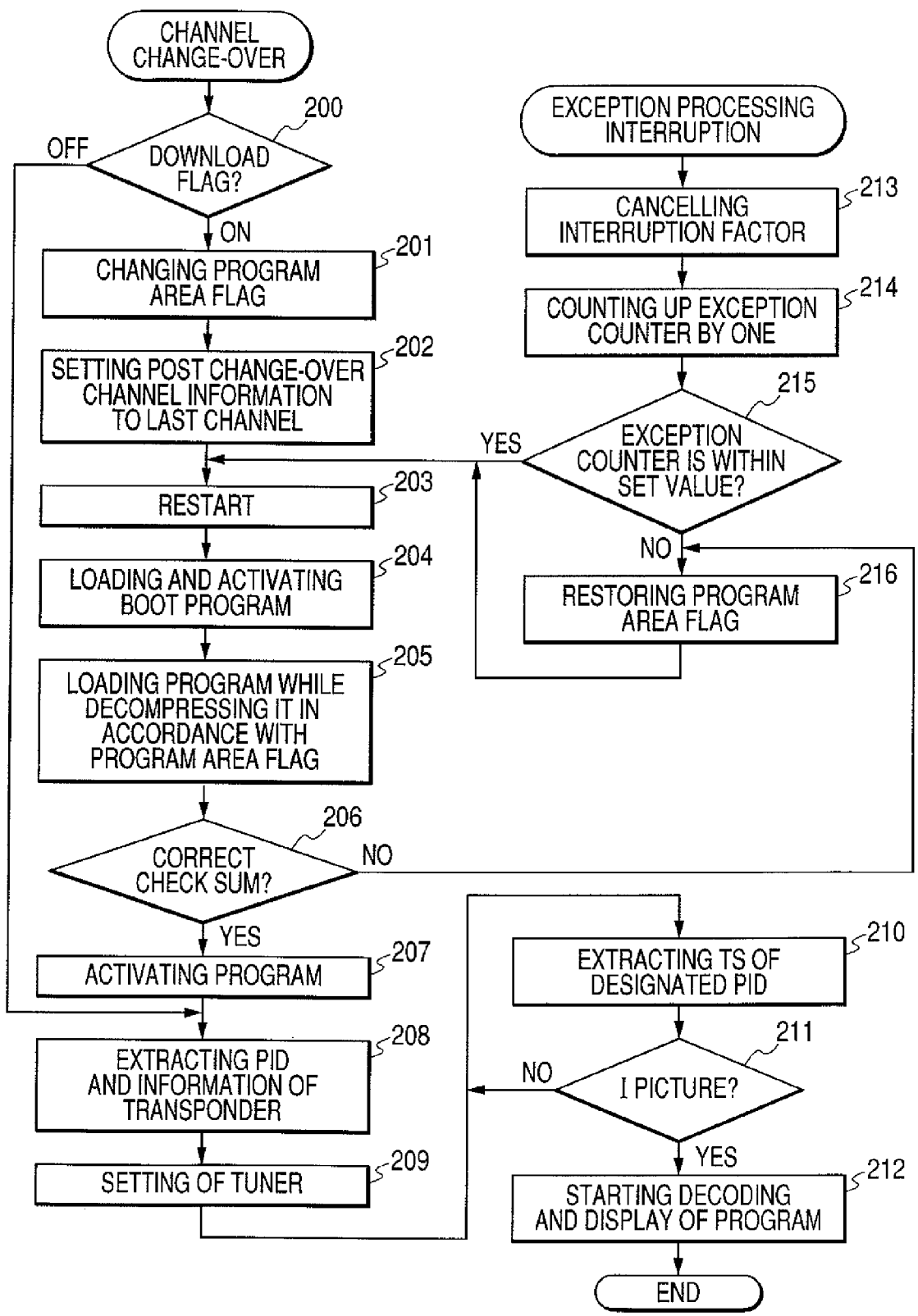
FIG. 10 is a flow chart illustrating an update process to be executed at the time of channel change-over.

The first embodiment of the present invention will be described with reference to FIGS. 1A and 1B to FIG. 10. FIG. 1A is a diagram showing the structure of a digital television broadcasting receiving apparatus. FIG. 1B is a block diagram showing the control concept of a system controller according to the first embodiment. FIG. 2 is an illustrative diagram showing the structure of digital video data of MPEG2. FIG. 3 is a diagram showing a transmission format of data of MPEG2. FIG. 4 is a diagram showing the format of a picture header. FIG. 5 is a diagram showing a picture code type. FIG. 6 is a diagram showing a layout of four digital video data. FIG. 7 is a diagram showing a layout of four multiplexed digital video data. FIG. 8 is a diagram showing the internal structure of a volatile memory. FIG. 9 is a diagram showing the internal structure of a non-volatile memory. FIG. 10 is a flow chart illustrating an update process to be executed at the time of channel change-over.

As shown in FIG. 1A, a digital television broadcasting receiving apparatus 20 is provided with a tuner 2 connected to an antenna 1, a demultiplexing circuit 3, a video decoder (decoding means) 4, an image processing circuit 5, an adder 6, an image output circuit 7 connected to a monitor 8, an audio decoder (decoding means) 9, an audio processing circuit 10, and an audio output circuit 11 connected to a speaker 12. The digital television broadcasting receiving apparatus 20 is also provided with a remote control receiver 14 for receiving a command signal from a remote control transmitter 13, a non-volatile memory 16, a volatile memory 17, a system controller 18 and an on-screen-display (SOD) display unit 15.

The system controller 18 has a download unit 18d as shown in FIG. 1B which unit is operated by an operation program to be detailed later, and is constituted of a channel designation detection unit 18a, a channel change-over update decision unit 18b, a channel change-over processing unit 18c and an update program discrimination unit 18e. The system controller 18 has also an update unit 18g including a save completion decision unit 18f and an at-channel-change-over update unit 18h, an interruption processing decision unit 18l, and an at-interruption update stop unit 18j. Although the system controller 18 has a large number of functional units operated by the operation program, each functional unit shown in FIG. 1B shows only the gist of the present invention, and other functional units are omitted for the purposes of description simplicity.

As shown in FIG. 1A, the antenna 1 receives a digital television broadcasting signal transmitted from a satellite. The antenna 1 is generally provided with a frequency converter to supply a received, frequency converted signal to the tuber 2. The tuner 2 extracts a signal having a predetermined frequency from a high frequency digital modulation signal containing image/audio data. Namely, the tuner selects one of a plurality of transponders of digital television broadcasting. The tuner 2 is provided with a reverse interleave circuit, an error correction circuit and the like to demodulate the selected digital modulation signal and output a transport stream.

The demultiplexing circuit 3 separates the transport stream received from the tuner 2 into a video transport packet, an audio transport packet, program specific information (PSI) and an update program packet, respectively of MPEG2. The demultiplexing circuit 3 supplies the video transport packet and audio transport packet to the video decoder 4 and audio decoder 9, respectively, and service information contained in PSI and the update program packet to the system controller 18.

A plurality of channels are multiplexed in the transport stream. A process of selecting an optional channel can be realized by extracting, from PSI, data indicating that the optional channel is multiplexed in the transport stream by using which packet ID. The download program itself and an ID for extraction thereof can also be acquired from PSI. Selecting a transport stream (selecting a transponder) can be realized in accordance with PSI.

The video decoder 4 is provided with a video decode unit (as software or hardware circuit) for decoding a video transport packet, whereas the audio decoder 9 is provided with an audio decode unit (as software or hardware circuit) for decoding an audio transport packet. The video decoder 4 decodes an input variable length code to obtain a quantization coefficient and a motion vector to perform motion compensation control and the like on the basis of inverse DCT transform and motion vector. The audio decoder 9 decodes an input encoded signal to generate audio data. The video data generated by the video decoder 4 is output to the image processing circuit 5, whereas the audio data generated by the audio decoder 9 is output to the audio processing circuit 10.

The image processing circuit 5 receives video data from the video decoder 4, and D/A converts the video data, for example, converts the video data into a composite signal of the NTSC format to output the composite signal to the image output circuit 7. The audio processing circuit 10 receives audio data from the audio decoder 9, and D/A converts the audio data to generate right (R) and left (L) analog signals to output the analog signals to the audio output circuit 11. The image output circuit 7 and audio output circuit 11 are provided with output resistors, amplifiers and the like. The NTSC composite signal output from the image output circuit 7 is output to the monitor 8 via an image output terminal (not shown) to display an image on the monitor 8. Audio analog signals output from the audio output circuit 11 are output to the speaker 12 via right and left audio output terminals (not shown) to output sounds and voices from the speaker 12.

The on-screen-display (OSD) display unit 15 outputs bit map data of character information designated to be output by the system controller 18, to the adder 6. The adder 6 assembles the bit map data into the video data output from the image processing circuit 5. An electronic program guide (EPG) screen, an operation guide screen and the like based on the service information contained in PSI received by the system controller 18 can be displayed by the SOD display unit 15 and adder 6.

The remote control transmitter 13 is used for sending a command to the digital television broadcasting receiving apparatus 20. As keys (not shown) mounted on the remote control transmitter 13 are operated, an optical signal (remote controller signal) representative of a command corresponding to the operated keys is sent from a light emission unit (not shown). The remote control receiver 14 receives the optical signal, converts the optical signal into an electric signal, and outputs the electric signal to the system controller 18.

Description will be made on an encoding method for digital video data of MPEG.

In MPEG, one sequence of digital video data is divided into a group of pictures (GOP) constituted of a plurality of frames (pictures) in order to effect encoding. As shown in FIG. 2, GOP is constituted of a combination of: an I (Intra coded) picture (intra-frame coded picture) having information of one screen by itself without having temporal difference information; a P (Predictive coded) picture (inter-frame coded picture) which is obtained by an I picture added with information on temporal information such as a motion, and generated by predicting from a frame at a preceding time; and a B (Bi-directionally coded) picture (inter-frame encoded picture) which is generated by predicting from two frames at preceding and succeeding times. In other words, the I picture is digital video data generated from a screen of one frame. If the I picture is detected, a corresponding image can be reproduced. The P picture is digital video data containing only a difference from a previously appeared I picture or a previously appeared P picture, and an image can be reproduced by using the previously appeared I picture or previously appeared P picture. The B picture is digital video data containing only a difference between the I picture and P picture or between two P pictures, and an image can be reproduced by using the I picture and P picture or two P pictures. Since the P picture and B picture contain only difference information, an image cannot be reproduced even if digital video data of only the P picture or B picture is received, although the data amount thereof is small.

Digital video data of each picture is not broadcast by itself, but a header code and the like are added to the digital video data for broadcasting. As shown in FIG. 3, digital video data of each picture is input to "picture_data". Attribute information indicating the type of the picture is input to "picture_header". The format of "picture_header" is shown in FIG. 4. As defined in FIG. 5, "001" of "picture coding type" indicates the I picture, "010" indicates the P picture, and "101" indicates the B picture.

Next, the transport stream will be described. FIG. 6 shows, for example, four digital video data "A", "B", "C" and "D". The stream "A" is transmitted in the picture order of I, B, B, P, B . . . . Although the stream "B", "C" and "D" are also transmitted in the picture order of I, B, B, P, B, . . . , timings when the I picture appears are different. Namely, even if a channel is changed over from "A" to "B", "A" to "C" or "A" to "D", or conversely from "B" to "A", "C" to "A" or "D" to "A", the decoding process for images cannot be executed until the I picture appears. GOP of BS digital broadcasting is constituted of fifteen frames in many cases, and the I picture does not appear for 0.5 second at the longest.

In the transport stream, for example, these four streams are multiplexed, and its structure is as shown in FIG. 7. The transport stream is constituted of packets each having 188 bytes. The four streams are divided into packets and multiplexed. Namely, each stream before multiplexing is divided into packets and then multiplexed. Therefore, information indicating the stream of each packet is added to a header field of each packet, for use in decoding. This information is called packet identification (PID).

The system controller 18 is connected to (or may be provided with) the electrically erasable non-volatile memory 16 such as EEPROM and the volatile memory 17 such as RAM. As shown in FIG. 8, the volatile memory 17 has in its storage area 171 a program memory for storing the operation program and controlling the digital television broadcasting receiving apparatus. A program information table for storing service information is stored in a storage area 172. A work memory is stored in a storage area 173, the work memory being used as a buffer or the like necessary for decoding MPEG compression video and audio data. A program download buffer for downloading a program is assigned to a storage area 174. A download flag is stored in a storage area 175, the download flag indicating the state of whether the program is downloaded or not.

Service information extracted by the Demultiplexing circuit 3 and sent to the system controller 18 is stored in the storage area 172 of the volatile memory 17 storing the program information table. This service information includes a service number (SID) of a program presently broadcasted, table information indicating a relation between SID and PID, information indicating which transponder is used for transmitting each service, a start time and contents explanation of each program, and the like.

As shown in FIG. 9, the non-volatile memory 16 is provided with a storage area 161 for storing a boot program which is loaded and activated first when a power is turned on. A storage area 162 is also provided for storing a maker ID of the digital television broadcasting receiving apparatus. A storage area 163 is also provided for storing a model ID of the digital television broadcasting receiving apparatus. A storage area 166 for a program area A and a storage area 168 for a program area B are also provided. A storage area 165 and a storage area 167 are also provided for storing versions of the programs. A storage area 164 is also provided for storing a program area flag indicating which one of the operation programs in the program areas is being executed. A storage area 169 is also provided for an exception counter. A storage area 180 for a last channel and a storage area 181 for a work area are also provided.

As the area for storing the operation program of the digital television broadcasting receiving apparatus, two areas are prepared, i.e., the storage area 166 for the program area A and the storage area 168 for the program area B. The exception counter is provided in the storage area 169 for the exception counter. The exception counter counts the number of branches to an exception process which is executed when the downloaded program does not operate correctly, such as memory violation, and illegal operation code detect. Transponder information and PID of the channel are stored in the storage area 180 for the last channel, so that the same channel can be selected when the power is turned on again, by saving the channel viewed before the power is turned off. Adjustment values of the monitor such as lightness and chromaticness are stored in the storage area 181 for the work area.

The download unit 18d of the system controller 18 monitors information contained in PSI and separated by the demultiplexing circuit 3 to acquire a download control table (DCT). The download control table includes a maker ID, a model ID and a version of the operation program. The update program discrimination unit 18e of the system controller 18 judges whether the maker ID and model ID in the non-volatile memory 16 are compatible with those of the digital television broadcasting receiving apparatus. If it is judged that the maker ID and model ID in the non-volatile memory 16 are compatible with those of the digital television broadcasting receiving apparatus, it is judged whether the version of the operation program is newer than that of the presently mounted operation program. The version of the operation program is compared with the versions of both the program version A in the storage area 165 and the program version B in the storage area 167. If the version of the operation program is newer than both the versions, the update program data starts being downloaded. Comparison with both the program versions A and B is performed to deal with the case wherein a newer operation program is sent before the operation program is downloaded and the update process is executed.

The downloaded operation program was compressed by a reversible compression algorithm such as a ZIP algorithm to reduce a transfer amount. The downloaded operation program is saved in the storage area 174 in the volatile memory 17 for the program download buffer. Since a check sum is added to the operation program to judge whether the operation program is downloaded normally, the save completion decision unit 18f of the system controller 18 checks the check sum to thereby judge whether the operation program is downloaded (completed) normally.

If the operation program is downloaded normally, the program area flag recorded in the storage area 164 of the non-volatile memory 16 indicates whether the operation program of the digital television broadcasting receiving apparatus 20 presently executed is stored in which of the storage area 166 for the program area A and the storage area 168 for the program area B. The operation program saved in the storage area 174 for the program download buffer is written in the program area not in use. In this case, the operation program is maintained being compressed and added with the check sum. The reason for maintaining being compressed is to reduce the capacity of the non-volatile memory 16. A corresponding one of the program version A in the storage area 165 of the non-volatile memory 16 and the program version B in the storage area 167 is updated to the version of the downloaded (saved) operation program. As the operation program is downloaded, the download flag in the storage area 175 of the volatile memory 17 is set to be "ON".

Next, description will be made on the channel change-over which is the gist of the present invention. For example, when a user changes over a channel, the user depresses a button (not shown) of the remote control transmitter 13 for requesting to display EPG, so that an EPG display request signal is sent to the system controller 18 via the remote control receiver 14. The system controller 18 extracts a start time and contents explanation of a program presently broadcast, from the program information stored in the storage area 172 for the program information table, and sends character information to the OSD display unit 15. The OSD display unit 15 generates EPG bit map data. The EPG bit map data is output to the monitor 8 via the adder 6 and image output circuit 7 to display an EPG screen on the monitor 8. The user views the EPG screen and designates a desired program (channel to be selected) by using the remote control transmitter 13. An optical signal from the remote controller transmitted 13 is sent via the remote control receiver 14 to the channel designation detection unit 18a of the system controller 18, which unit analyzes to decide the program designated by the user and obtains SID of the designated program. Thereafter, information on PID corresponding to SID and information on the transponder is acquired from the program information table in the storage area 172.

If the present program (selected channel) is different from the desired program (channel to be selected) designated by the remote control transmitter 13, the channel change-over decision unit 18b of the system controller 18 judges that the channel is to be changed over. In order to stop the program presently displayed, the system controller 18 instructs the demultiplexing circuit 3, video decoder 4 and audio decoder 9 to stop the decoding process, i.e., to stop outputting video and audio data.

Next, the channel change-over process will be described with reference to FIG. 10. As described above, as the channel change-over decision unit 18b judges that the channel is to be changed over, at Step 200 the download flag 175 in the storage area 175 is checked. Namely, the save completion decision unit 18f judges whether the operation program was downloaded normally. If download is not completed normally, the flow advances to Step 208 (advances along a broken line arrow shown in FIG. 1B) to start a channel change-over process by the channel change-over processing unit 18c to be described later in detail.

If the download was normally completed, the at-channel-change-over update unit 18h starts an at-channel-change-over update process. At Step 201, the program area flag is changed over to the program area opposite to the program area designated by the program area flag in the storage area 164. Next, at Step 202, the transponder information and PID of the changed-over channel are written in the storage area 180 for the last channel storage area. Thereafter, at Step 203, the digital television broadcasting receiving apparatus 20 (or hardware to be restarted) is restarted. Restart can be performed generally by passing the control to a reset vector of the system controller 18.

Once the restart is performed, at Step 204, the boot program is loaded from the storage area 161 for the boot program into the storage area 173 for the work area. The boot program judges the program area flag in the storage area 164 for the boot program, loads the operation program in the program area A or B, i.e., the downloaded operation program, into the storage area 171 for the program memory, while compression of the operation program is extracted, and checks the check sum of the operation program. If the check sum check result is normal, the flow advances to Step 207 whereat the operation program is activated by setting the program counter to the execution start address of the operation program. If the check sum check result is normal and the operation of the system controller 18 is passed to the process by the loaded operation program, the program memory for load execution becomes unnecessary. Therefore, the storage area 173 for the work area not in use at this time may be used for storing other data.

If it is judged at Step 206 that the check sum check result is not normal, it means that the operation program cannot be written correctly in the non-volatile memory 16 (or the operation program was not downloaded normally). The flow advances to Step 216 whereat the program area flag in the storage area 164 recovers the original state. The program area flag recovers the program area flag of the previous operation program used previously (the operation program different from the downloaded operation program), among the operation programs in the program area A and B. Thereafter, the flow advances to Step 203 to restart the previous operation program and reloads the operation program into the storage area 171 for the boot program. In this case, since the check sum check is normal, the operation program is activated (Steps 203 to 207).

If an exception process (an unexpected interruption process or the like), which, for example, may hinder the calculation processing ability (CPU power), occurs during the at-channel-change-over update process at Steps 200 to 207, the interruption processing decision unit 181 judges that the exception process occurred. Then, first at Step 213, the at-interruption update stop unit 18j clears a factor of the exception process so as not to make the exception process interruption occur. Next, at Step 214, the exception counter in the storage area 169 is incremented by 1 to thereafter advance to Step 215.

It is judged at Step 215 whether the exception counter in the storage area 169 has a count equal to or smaller than a preset value, to consider that the program is changed over to the previous program when a number of exception process interruptions occur, such as exception process interruptions by external noises. If the count is equal to or smaller than the preset value, the flow advances to Step 203 to execute the restart. If the count is larger than the preset value, the flow advances to Step 216 whereat the program area flag in the storage area 164 recovers the original flag, similar to the case wherein the check sum check is not normal. Thereafter, the restart is executed by using the previous operation program, and this operation program is reloaded into the storage area 171 for the program memory. In this case, since the check sum check is normal, the operation program is activated (Steps 203 to 207). If the uploaded program was normally downloaded, the uploaded program is updated at the next channel change-over.

As the at-channel-change-over update process is completed in this manner, the channel change-over processing unit 18c starts the channel change-over process. In the channel change-over process, first at Step 208, the transponder information and PID are acquired from the storage area 180 for the last channel to thereafter advance to Step 209 whereat the frequency to be set to the tuner 2 is acquired from the transponder information and the tuner 2 is set to the acquired frequency. At Step 210, TS of the designated PID is extracted. Thereafter, at Step 211, the extracted TS is converted into ES to judge the picture header. If the judged picture header does not indicate the I picture, but indicates the B or P picture, the flow returns to Step 210 to repeat Steps 210 and 211 until the I picture is detected. Namely, the video and audio data does not start being output until the I picture appears. If the judged picture header indicates the I picture, the flow advances to Step 212 whereat decoding video and audio data starts (a decoding process starts for the channel data signal of the channel to be selected), and then a video and audio data of the program starts being output via the monitor 8 and speaker 12. In this manner, the channel is changed over.

As described above, according to the present invention, the update process for the operation program requiring to intercept the decoding process (namely, requiring to intermittently stop an image display) is performed when a channel is changed over (during the period from when the channel change-over is judged to when the next channel starts being decoded). Accordingly, the program update process can be performed without giving a sense of incompatibility to the user and forcing the user to perform unnecessary operations. Furthermore, it becomes possible to update the new operation program without waiting for that the power is turned on next.

When an exception interruption process occurs during the update process for the operation program, the update process is stopped. It is therefore possible for the channel change-over process not to take a long time and not to hinder the calculation processing ability (CPU power). Furthermore, since the operation program can be updated safely, reliability of the digital television broadcasting receiving apparatus can be improved.

Second Embodiment

Figure 11:
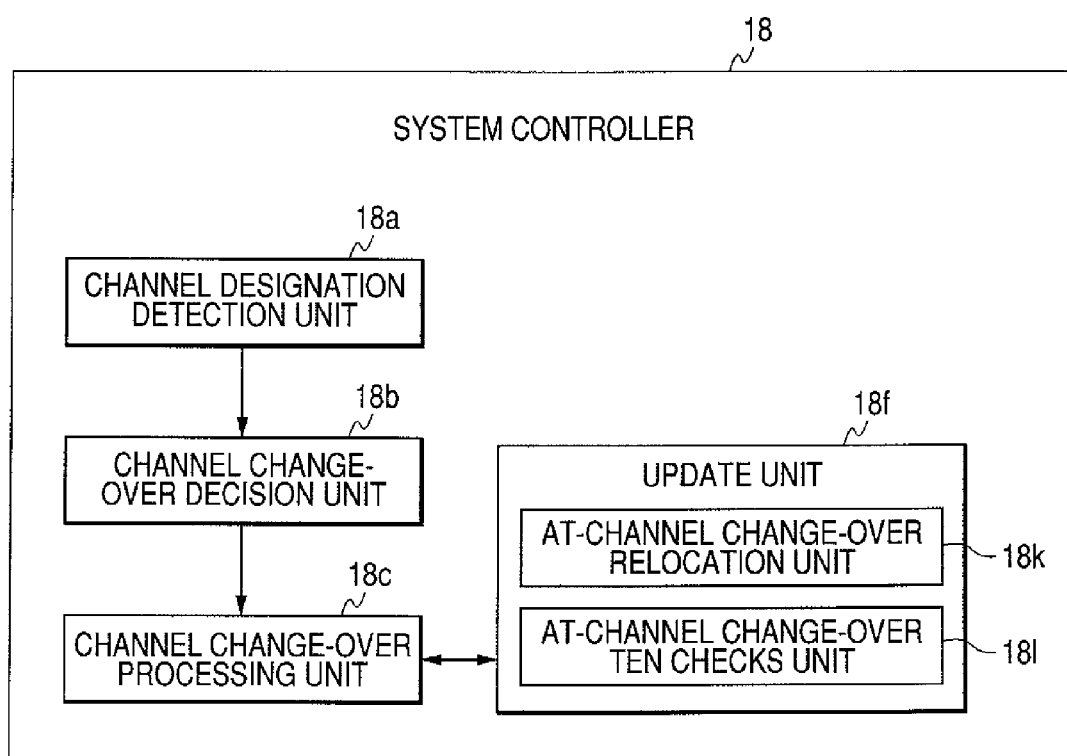
FIG. 11 is a block diagram illustrating a control concept of a system controller according to a second embodiment.
Figure 12:
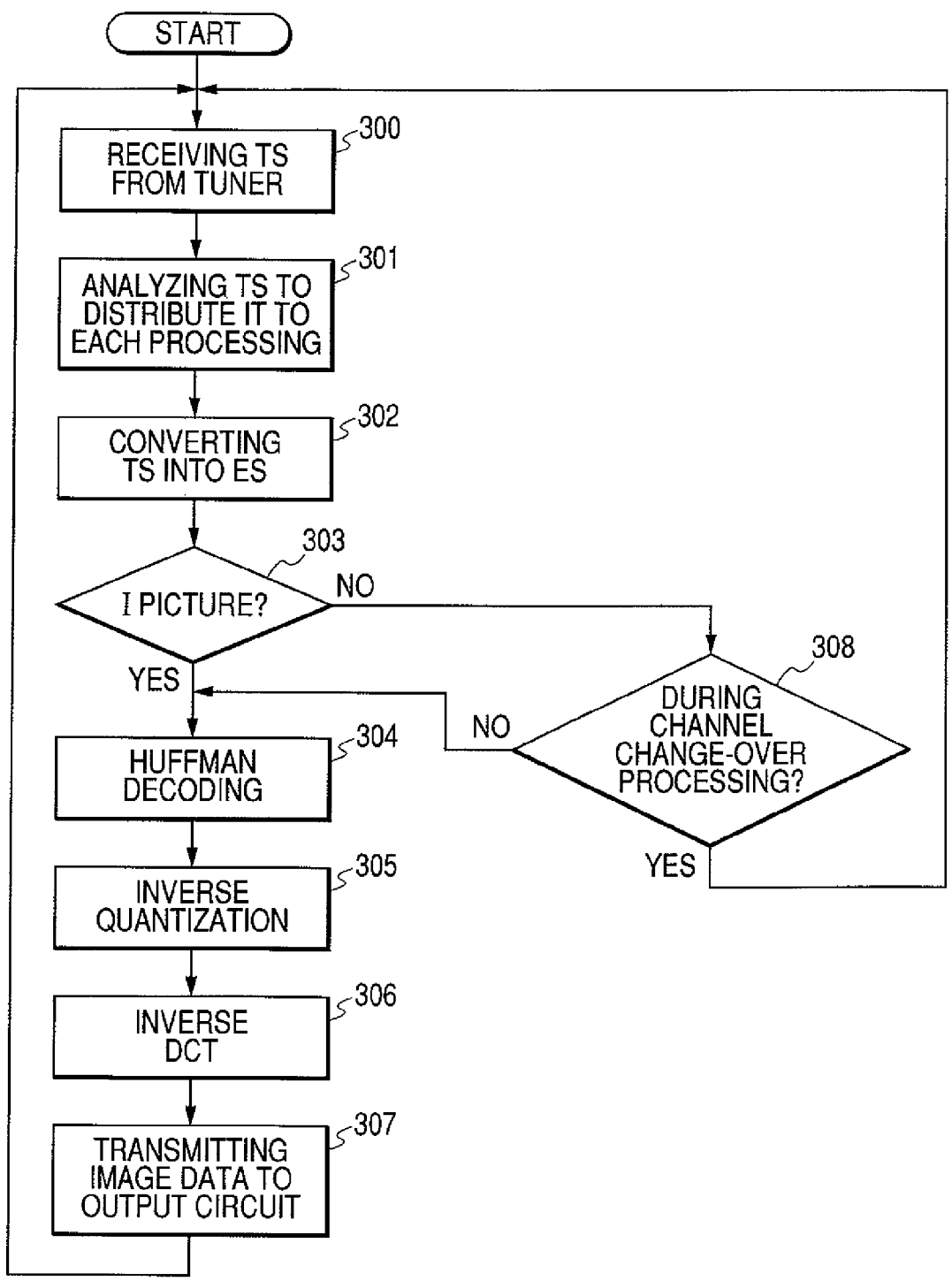
FIG. 12 is a flow chart illustrating a process to be executed at the time of channel change-over.
Figure 13:
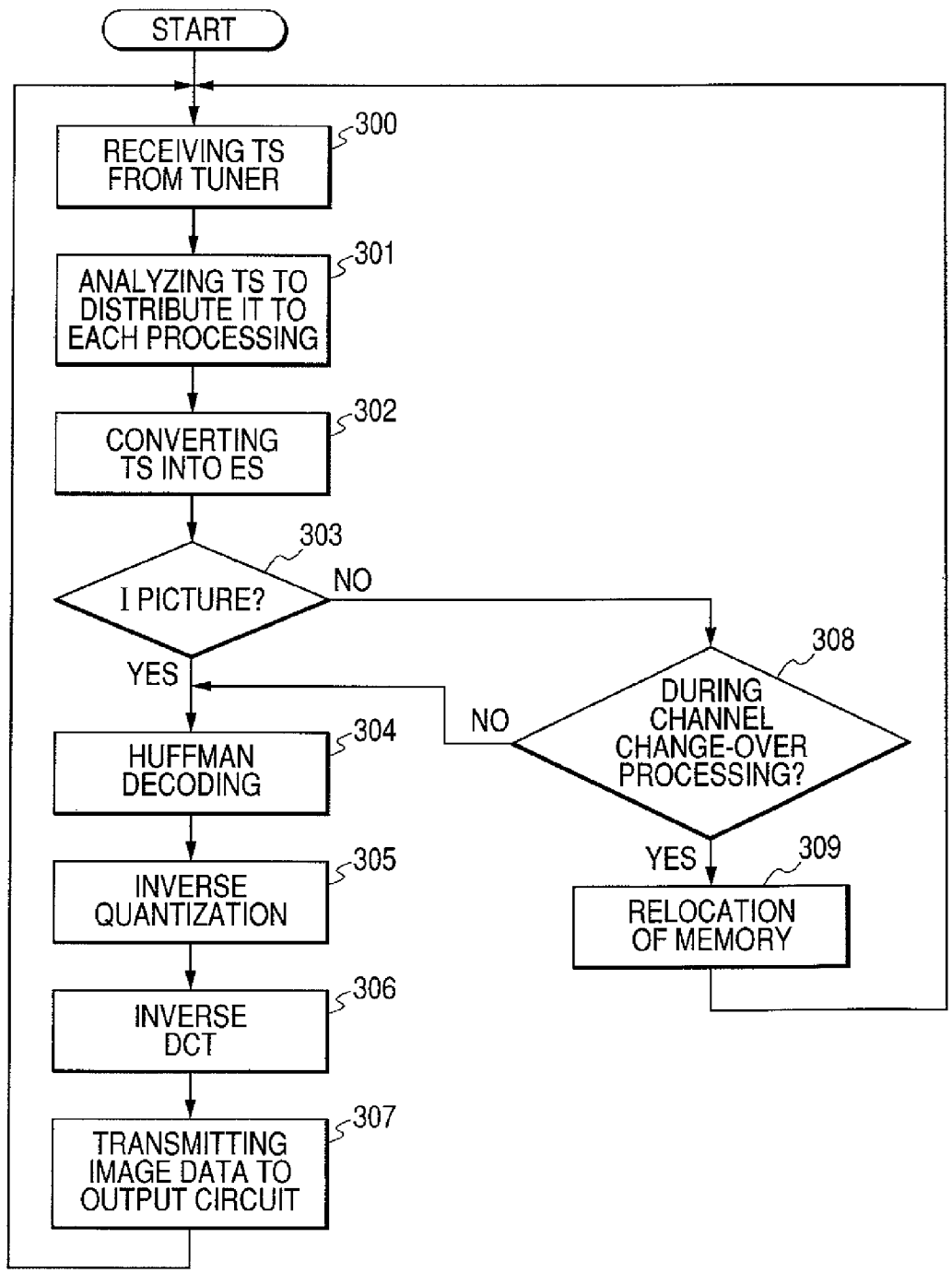
FIG. 13 is a flow chart illustrating a relocation process to be executed at the time of channel change-over.
Figure 14A:
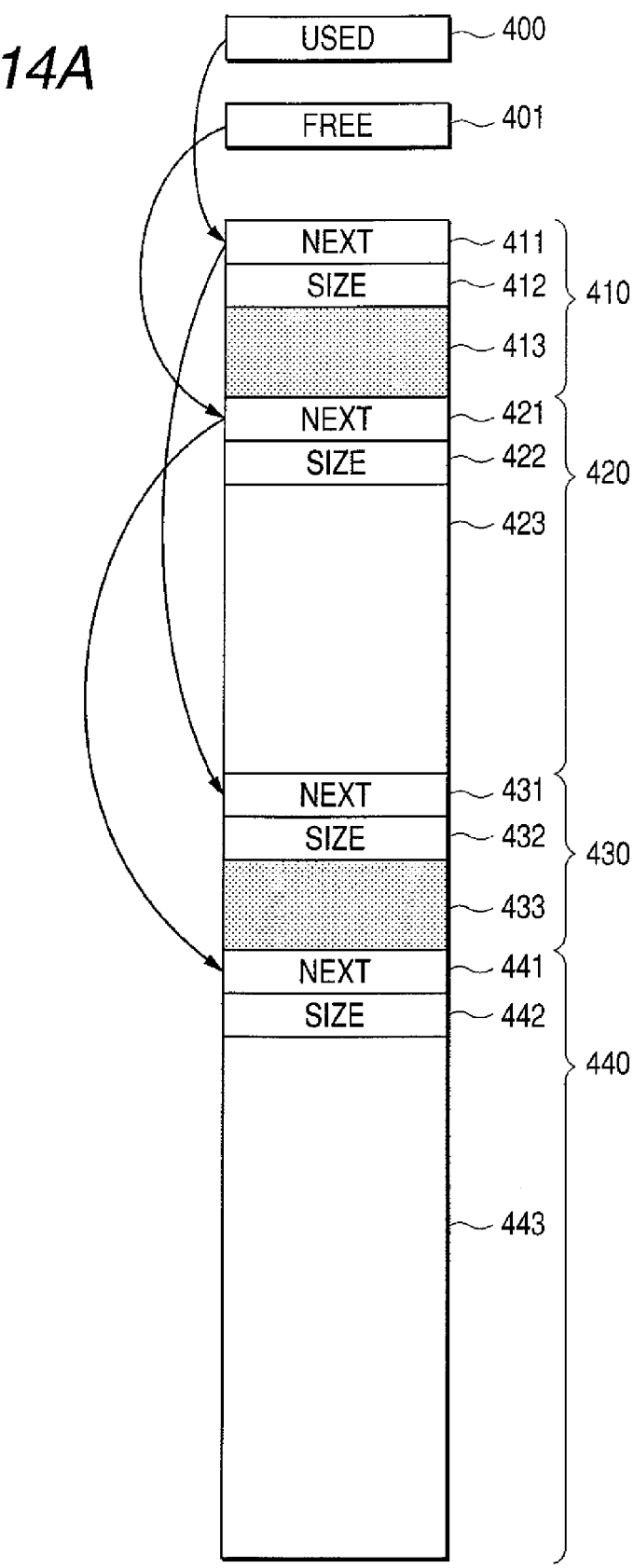
FIG. 14A is a diagram showing memory blocks in use and memory blocks not in use.
Figure 14B:
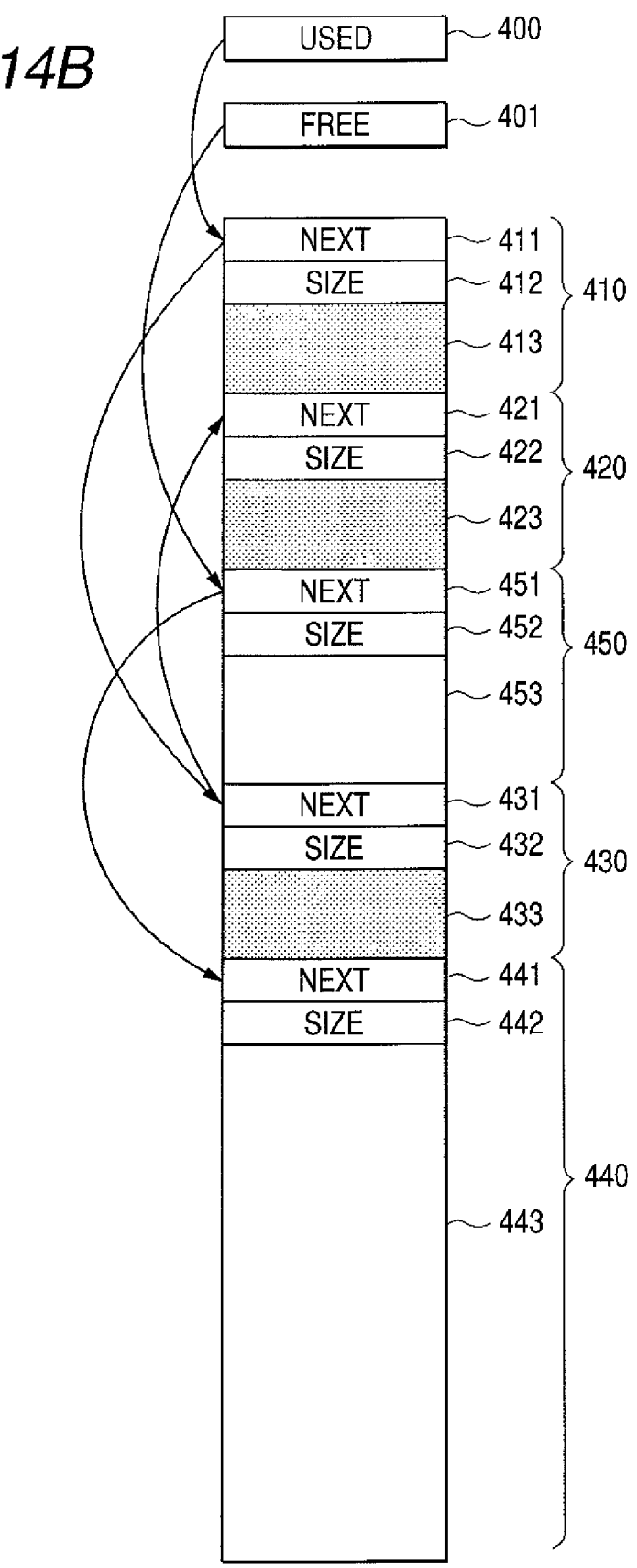
FIG. 14B is a diagram showing memory blocks in use and memory blocks not in use when memory blocks in use is increased.
Figure 14C:
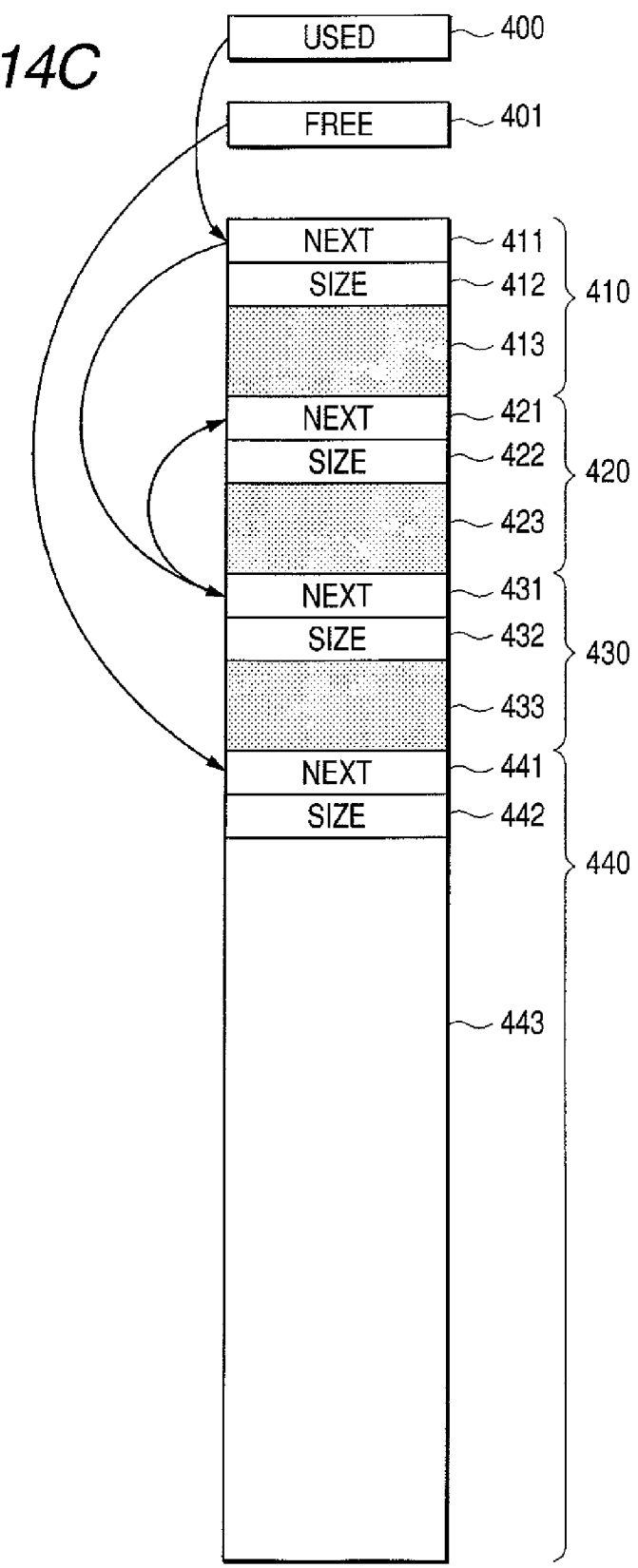
FIG. 14C is a diagram showing memory blocks in use and memory blocks not in use after relocation is performed.

Next, the second embodiment of the present invention will be described with reference to FIGS. 11 to 14C. FIG. 11 is a block diagram illustrating a control concept of a system controller according to the second embodiment. FIG. 12 is a flow chart illustrating a process to be executed at the time of channel change-over. FIG. 13 is a flow chart illustrating a relocation process to be executed at the time of channel change-over. FIG. 14A is a diagram showing memory blocks in use and memory blocks not in use. FIG. 14B is a diagram showing memory blocks in use and memory blocks not in use when memory blocks in use increase. FIG. 14C is a diagram showing memory blocks in use and memory blocks not in use after relocation is performed. In the second embodiment, similar parts to those of the first embodiment are represented by identical reference symbols and the description thereof is omitted, excepting partially different parts from the first embodiment.

As shown in FIG. 11, a system controller 18 of the second embodiment is provided with an at-channel-change-over relocation unit 18g operating under the operation program. The at-channel-change-over relocation unit has a channel designation detection unit 18a, a channel change-over decision unit 18b, a channel change-over processing unit 18c, an at-channel-change-over relocation unit 18k and an at-channel-change-over I/O check unit 181. Although the system controller 18 has a large number of other functional units operated by the operation program, each functional unit shown in FIG. 11 shows only the gist of the present invention, and other functional units are omitted for the purposes of description simplicity.

Next, description will be made on the block structure of the memory such as the non-volatile memory 16 and volatile memory 17. As shown in FIG. 14A, a storage area 400 stores a pointer to a memory block in use, and a storage area 401 stores a pointer to a memory block not in use. Blocks 410 and 430 are memory blocks in use and a header is added to the top of each memory block. A next pointer indicating an address of the next block in use is recorded in storage areas 411 and 431 as the headers of the memory blocks 410 and 430 in use. A memory size used by the blocks 410 and 430 is recorded in storage areas 412 and 432. Storage areas 413 and 433 are memory areas actually acquired. The next pointer in the storage area 431 records NULL (0) indicating that there is no next memory block in use (on the lower side in FIG. 14A).

Blocks 420 and 440 are memory blocks not in use and a header similar to the memory block in use is added. A next pointer indicating an address of the next block not in use is recorded in storage areas 421 and 441 as the headers of the memory blocks 420 and 440 not in use. A memory size of the blocks not in use is recorded in storage areas 422 and 442. Storage areas 423 and 443 are memory areas not in use. The next pointer 441 records NULL indicating that there is no next memory block not in use.

When a memory secure request occurs, it is checked via the pointer to the memory block not in use in the storage area 401 and the next pointer in the storage area 421 that the next pointer to the memory block not in use in the storage area 431 is NULL. The size to be secured is compared with the sizes of the memory blocks not in use recorded in the storage areas 422 and 433, and the memory block having a size larger than the size to be secured is selected. A memory area to be secured is allocated to the memory area of the memory block not in use having the smallest area among the selected memory blocks.

It is assumed for example that the memory area is secured in the storage area 423, in accordance with the size to be secured (requested). The requested size is secured in the storage area 423 and thereafter, the header is formed (header is rewritten in the storage areas 421 and 422). Since the remaining area is not used, a memory block not in use is formed in the remaining area. Namely, as shown in FIG. 14B, in the remaining area of the memory block 420 in use newly secured, a new memory block 450 not in use is formed. The size recorded in the previous storage area 422 subtracted by the requested size is recorded as the memory size of the storage area, and the storage area 422 is changed to the requested size. Next, the next pointers in the storage areas 421 and 451 are changed. In this manner, the block 420 is coupled to the pointer chain to the memory block in use, and the block 450 is coupled to the pointer chain of the memory block not in use.

Assuming for example that the sizes of the memory blocks not in use in the storage areas 452 and 442 shown in FIG. 14B are 300 bytes and 900 bytes, respectively and that the requested size is 1000 bytes, the requested size is too big and cannot be secured. However, the total sum of the memory blocks not in use can secure the requested size. Therefore, as shown in FIG. 14C, a memory relocation process is performed to move the memory block 430 in use and couple the memory blocks 450 and 440 not in use. Since this process copies the contents of the memory to be moved, and changes the next pointers, this process takes a long time if memory blocks not in use are divided finely and become fragmentary. Since this process is a process of moving blocks several times, this process can be executed a plurality of times distributively without coupling all memory blocks at a time.

Next, description will be made on the case wherein the channel change-over process is combined with the MPEG2 decoding process for displaying programs. In the following, description is limited to the decode process only for images. As shown in FIG. 12, at Step 300 a TS packet is received from the tuner 2, and at Step 301, PID in the header field of TS is checked to judge the designated PID, and PID of the video data is extracted. At Step 302, TS is converted into ES, and at Step 303, the picture flag of ES is judged. If the picture flag judged at Step 303 indicates a P or B picture, the flow advances to Step 308 whereat it is judged whether the process is the channel change-over process by the channel change-over processing unit 18c. If during the channel change-over process, the flow returns to Step 300 because an appearance of the I picture is awaited. If the picture flag indicates the I picture, it means that the I picture appears, and the video decoder 4 performs Huffman decoding, inverse quantization and IDCT processes (Steps 304 to 306). Thereafter, at Step 307, video data is sent to the image processing circuit 5, and an image output from the image output circuit 7 is displayed on the monitor 8.

Of the MPEG2 decoding process described above, the Huffman decoding, inverse quantization and IDCT processes require a large calculation processing amount (CPU time) and a large memory area. In order to solve this, Steps 300 to 303 and Step 308 are repeated until the I picture appears in the channel change-over process, and the processes at Steps 304 to 307 requiring a large calculation processing amount are not executed. In this manner, memory relocation can be performed at the time of channel change-over.

Namely, as shown in FIG. 13, the flow progresses from Step 308 to Step 309 until the I picture appears during the channel change-over process, to thereby make the at-channel-change-over relocation unit 18k execute the above-described memory relocation process. As described above, since the memory relocation process can be executed a plurality of times distributively, memory blocks not in use are coupled during the period up to appearance of the next I picture. Namely, the relocation process is completed before the next I picture appears.

In the processes described above, description has been made on the memory relocation process to be executed by the at-channel-change-over relocation unit 18k during the period up to appearance of the I picture during the channel change-over process. It is possible, however, for the at-channel-change-over I/O check unit 181 to check I/O of the digital television broadcasting receiving apparatus 20 in the manner similar to that described above. The check process by the I/O check unit 181 may use a generally known check method. This embodiment is not characterized in the method of checking whether I/O is normal, but is characterized in that the operation of I/O is checked during the channel change-over process by taking advantage of the period up to appearance of the I picture. Therefore, any I/O check method may be adopted. For example; techniques disclosed in Japanese. Patent Application No. H07-319780 may be adopted.

As described above, according to the present invention, the memory relocation process and I/O check process requiring to intercept the decoding process (namely, requiring to intermittently stop an image display) are performed when a channel is changed over (during the period from when the channel change-over is judged to when the next channel data signal starts being decoded). Accordingly, these processes can be performed without giving a sense of incompatibility to the user and forcing the user to perform unnecessary operations. Furthermore, it becomes possible to prevent the performance of the digital television broadcasting receiving apparatus from being degraded and predict troubles in advance.

In the embodiments described above, description has been made on the operation program update process, memory relocation process and I/O check process at the time of channel change-over. The embodiments are not limited thereto, but any process may be performed so long as the process intercepts the decoding process and does not give the user a sense of incompatibility at the time of channel change-over.

If the calculation processing ability and memory area of the digital television broadcasting receiving apparatus are sufficient, the operation program update process, memory relocation process and I/O check process may be performed at the same time. The priority order of these processes may be set to selectively perform these processes. Namely, if the channel is changed over a plurality of times in a short time period, a unit for sequentially performing these processes may be provided. For example, the operation program update process is performed at the time of the first channel change-over, the memory relocation process is performed at the time of the second channel change-over, and the I/O check is performed at the time of the third channel change-over.

According to the present invention, when the channel change-over decision unit judges a channel change-over, the update unit executes a process requiring to stop the decoding process by the decoding unit, before the decoding unit starts the decoding process for the channel data signal of a channel to be selected. Since the process requiring to stop an image display is performed at the time of channel change-over, it is possible to provide a digital television broadcasting receiving apparatus and a control method for the digital television broadcasting receiving apparatus, without giving the user a sense of incompatibility and forcing the user to perform unnecessary operations at the time of channel change-over.

By performing the update process for the operation program as the process requiring to intercept the decoding process by the decoding unit, it becomes possible to update the new operation program without waiting for that the power is turned on next.

Further, by performing the memory relocation process or I/O check process as the process requiring to intercept the decoding process by the decoding unit, it becomes possible to prevent the performance of the digital television broadcasting receiving apparatus from being degraded and to predict troubles in advance.

The object of the present invention can also be achieved by providing a storage medium storing program codes for performing the aforesaid processes to an image sensing system or apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as a local area network (LAN) and a wide area network (WAN), can be used for providing the program codes.

Furthermore, besides aforesaid functions according to the above embodiments are realized by executing the program codes which are read by a CPU of the image sensing system or apparatus, the present invention includes a case where an operating system (OS) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims. The invention is also applicable to a system having a plurality of apparatuses (e.g., a host computer, an interface apparatus, a reader, a printer and the like) or to a single apparatus (e.g., a copier, a facsimile or the like).

This application claims priority from Japanese Patent Application No. 2005-155623 filed May 27, 2005, which is hereby incorporated by reference herein.

What is claimed is:

1. A digital television broadcasting receiving apparatus being capable of receiving a digital television broadcasting signal containing a channel data signal corresponding to each channel and having a memory unit storing an operation program for controlling said digital television broadcasting receiving apparatus, said digital television broadcasting receiving apparatus comprising:

a decoding unit for executing a process of decoding the channel data signal into video and audio signals;

a decision unit for judging whether or not a channel change-over process occurs;

a storage unit for storing, in a predetermined area of said memory unit, an update operation program for updating the operation program, the update operation program being contained in the digital television broadcasting signal to be transmitted; and a processing unit for, if said decision unit judges that the channel change-over process occurred, executing an update process for said memory unit to make the update operation program stored in the predetermined area of said memory unit be executable, the update processing being executed during a period from a time when the channel change-over process occurred to a time when said decoding unit starts a decoding process for the channel data signal newly selected by the channel change-over process.

2. The digital television broadcasting receiving apparatus according to claim 1, further comprising:

an interruption process decision unit for judging whether a predetermined interruption process occurs while said processing unit executes the update process for said memory unit; and a stop process execution unit for executing a process of stopping the update process by said processing unit, in accordance with a judgment result by said interruption process decision unit.

3. The digital television broadcasting receiving apparatus according to claim 1, wherein said processing unit executes the update process of making the update operation program be executable, and further executes a decision process of judging whether the update operation program can operate normally.

4. The digital television broadcasting receiving apparatus according to claim 1, wherein if said decision unit judges that the channel change-over process occurred, said processing unit executes a relocation process of relocating an area in use and an area not in use of said memory unit, during a period from the time when the channel change-over process occurred to the time when said decoding unit starts a decoding process for the channel data signal newly selected by the channel change-over process.

5. A control method for a digital television broadcasting receiving apparatus being capable of receiving a digital television broadcasting signal containing a channel data signal corresponding to each channel and having a memory unit storing an operation program for controlling the digital television broadcasting receiving apparatus, the control method comprising the steps of:

decoding the channel data signal into video and audio signals;

judging whether or not a channel change-over process occurs;

storing, in a predetermined area of the memory unit, an update operation program for updating the operation program, the update operation program being contained in the digital television broadcasting signal to be transmitted; and if said judging step judges that the channel change-over process occurred, executing an update process for the memory unit to make the update operation program stored in the predetermined area of the memory unit be executable, the update process being executed during a period from a time when the channel change-over process occurred to a time when said decoding step starts a decoding process for the channel data signal newly selected by the channel change-over process.

6. The control method according to claim 5, further comprising the steps of:

an interruption process judging whether a predetermined interruption process occurs while said executing step executes the update process for said memory unit; and a stop process executing a process of stopping the update process by said executing step, in accordance with a judgment result by said interruption process judging step.

7. The control method according to claim 5, wherein said executing step executes the update process of making the update operation program be executable, and further executes a decision process of judging whether the update operation program can operate normally.

8. The control method according to claim 5, wherein if said judging step judges that the channel change-over process occurred, said executing step executes a relocation process of relocating an area in use and an area not in use of the memory unit, during a period from the time when the channel change-over process occurred to the time when said decoding step starts a decoding process for the channel data signal newly selected by the channel change-over process.

9. A non-transitory computer readable medium which comprises instructions for causing a computer to execute a control method for a digital television receiving apparatus, as set out in any one of claims 5 and 6 to 8.

* * * * *